Figure 1:
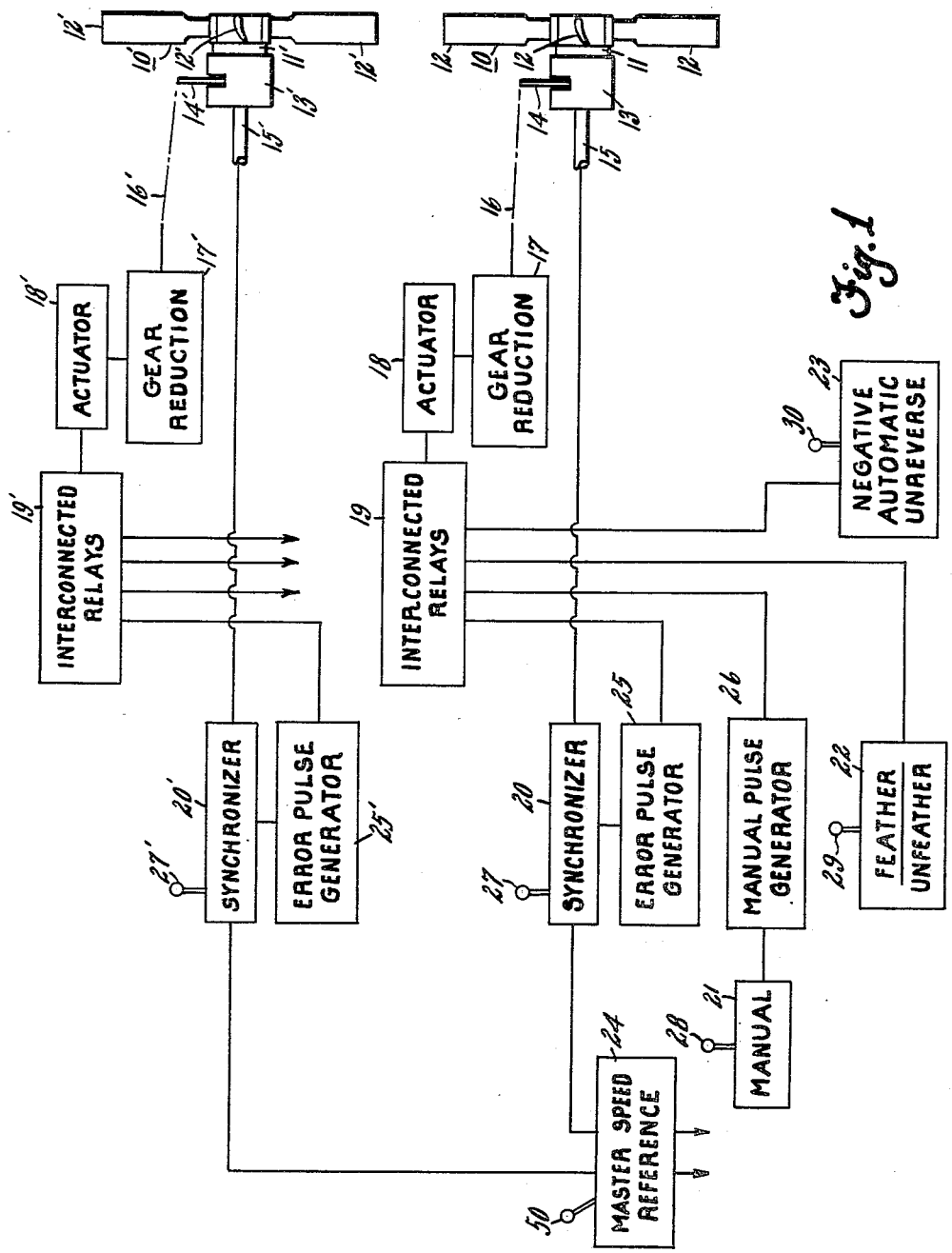

INVENTORS
NED W. LOWRY
ROBERT K. SKINNER
BY
Willits, Hardman and Lehr
THEIR ATTORNEYS

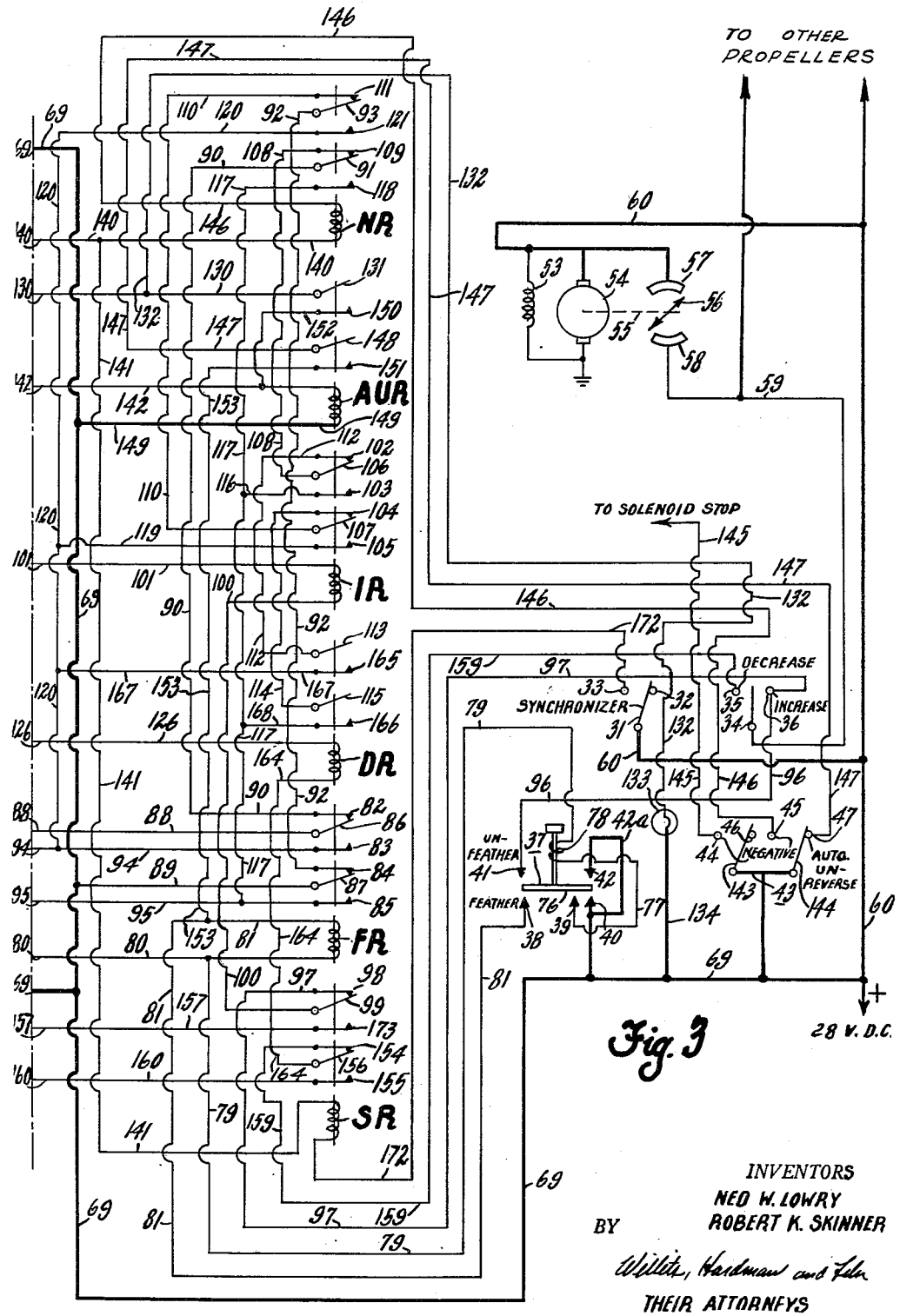

United States Patent Office 2,766,833
Patented Oct. 16, 1956

2,766,833

PROPELLER CONTROL SYSTEM

Ned W. Lowry, West Milton, and Robert K. Skinner, Dayton, Ohio, assignors to General Motors Corporation, Detroit, Mich., a corporation of Delaware Application November 13, 1952, Serial No. 320,178

9 Claims. (Cl. 170—135.24)

The present invention relates to variable pitch propellers and more particularly to a control system therefor.

Remote control of the various propeller functions of a multi-engine aircraft is of paramount importance. These propeller functions include feathering, negative thrust, manual speed adjustment of each propeller unit individually and speed synchronization of a plurality of propeller units with a master reference speed source. In control systems of this character, it is also vital to enable certain specified propeller functions to take precedence over others. For example, the preferential order of propeller functions must be as follows in the event of any malfunction occurring; feathering, negative thrust, unfeathering, increase propeller speed manually, decrease propeller speed manually, and synchronizing. Accordingly, one of our objects is to provide a control system having means enabling remote control of propeller operation in the various functions of each propeller unit and to further provide for the requisite over-ride of certain functions in the event of a malfunction occurring.

The aforementioned and other objects are accomplished in the present invention by providing an electrically operated actuator for each propeller unit, and an integrated electrical control system for energizing the actuators individually or concurrently, depending upon the particular control function selected by the pilot. Each propeller unit has associated therewith a self-contained fluid pressure system including centrifugally actuated valve mechanism for obtaining substantially constant speed propeller operation. The valve mechanism controls the application of fluid under pressure to suitable pitch changing mechanism disposed in the propeller hub. In addition, means, embodying an externally adjustable lever, are provided to select the speed of propeller operation or other propeller functions in lieu of constant speed operation or governing. The lever is adapted for pivotal movement under the control of an electrically actuated servomotor. The instant invention is concerned primarily with the electrical control means for energizing the actuator as dictated by the pilot. However, as the position of the actuator and perforce the position of the lever are indicative of the various propeller functions, recourse will be had herein to the various propeller functions to demonstrate the utility of this invention.

Each actuator includes a reversible electric motor capable of continuous energization and consequent continuous rotation, or pulsating energization resultant in a stepping movement of the motor. The actuator energization is effected by manipulation of switches comprising a control panel through the intermediary of a plurality of electrically interconnected relays which establish the precedence of certain functions over others in the event of a malfunction occurring in the circuitry. The specific components will hereinafter be described and generally include a synchronizer which produces pulsating signals in the event of a propeller unit speed error with respect to a master reference speed source, such signals being applied to the actuator and causing stepping movement thereof; a manual control system for selective speed control, likewise including means for producing pulsating electricial signals; and feathering, unfeathering, negative and automatic unreversing circuits for applying continuous energization to the actuator.

Further objects and advantages of the present invention will be apparent from the following description, reference being had to the accompanying drawings, wherein a preferred embodiment of the present invention is clearly shown.

In the drawings:

Fig. 1 is a block diagram of a control system designed according to the present invention for controlling a twin-engine aircraft.

Figure 2:
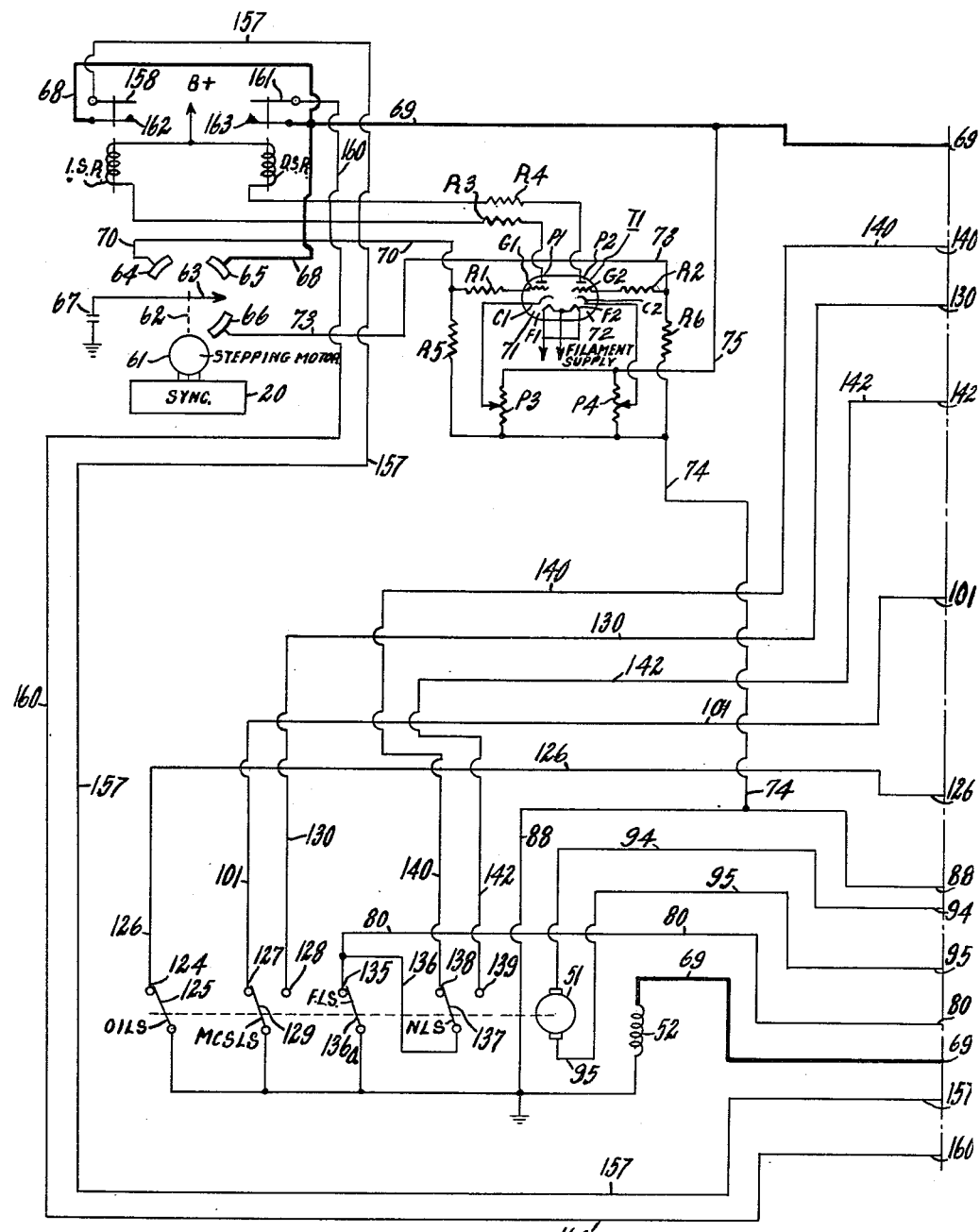

Figs. 2 and 3, combined, represent a schematic diagram of the electrical circuitry for one of the propeller units, each of the units having a similar system.

Referring more particularly to Fig. 1, the control system exemplified is in connection with a twin-engine aircraft only by way of example and not by way of limitation, as it is readily apparent that departure therefrom to include any number of engines is within the scope of the present invention. Moreover each propeller unit is susceptible of individual control as to certain functions, and all units can be conjointly controlled for synchronization. Two propeller units are shown at 10 and 10'. As the propeller units 10 and 10' are identical, only one will be described in detail with similar parts on the other being depicted by similar numerals having primes affixed. The propeller unit 10 includes a hub 11 within which a plurality of blades 12 are journaled for rotation about their longitudinal axes. Attached to and rotatable with the hub 11 is a regulator assembly 13 having a control lever 14 extending therefrom. The propeller units including the hub and regulator are rotated by shaft 15. The regulator 13 incorporates a fluid pressure system capable of effecting pitch changing movements of the blade 12 as determined by the position of lever 14 to provide the several propeller functions including feathering, negative thrust and governing or constant speed operation. Structurally the propeller units may take a form similar to those disclosed and claimed in the Blanchard, et al. Patents Nos. 2,307,101 and 2,307,102.

The regulator levers 14 and 14' are connected by mechanical linkages 16 and 16' to gear reduction units 17 and 17' which are driven by actuators 18 and 18'. As the control system for energizing the actuators of each propeller unit are identical, only one system will be described in detail with the similar parts of the other system denoted by like numerals with primes affixed. Energization of the actuator 18 is effected through the medium of a plurality of electrically interconnected relays designated by numeral 19. The interconnection of the relays 19 will appear more fully hereinafter but for the moment it will suffice to say that the relays are so interconnected that certain control functions will over-ride others. Four separate and distinct inputs are shown for the relays, namely, a synchronizer input 20, a manual speed control 21, a feathering and unfeathering control 22 and a negative and automatic unreverse control 23. The synchronizer compares the speed of shaft 15 with that of a master reference speed source 24. The synchronizer 20 senses any speed difference between that of the speed shaft 15 and the master reference source 24 and energizes an error pulse generator 25 in a manner which will later be described. The manual control 21 is utilized to increase or decrease the speed of its associated propeller unit and controls the application of the output of a manual pulse generator 26 through the relays 19 to the actuator. The synchronizer unit 20 is provided with a control lever 27 by which the pilot may connect or disconnect the synchronizing apparatus with the actuator 18. The manual control is provided with a lever 28 which the pilot may manipulate to increase propeller speed or decrease propeller speed. Similarly, the feather and unfeather control 22 is provided with a lever 29 to select either of the functions, and the negative and automatic unreverse control 23 is likewise provided with a lever 30 for selecting either function. The master speed reference source 24 is provided with a lever 50 for adjusting the speed output thereof.

Referring more particularly to Figs. 2 and 3, combined, the details of the control system associated with the propeller unit 10 of Fig. 1 will now be described. However, it is to be understood that each propeller unit has a like control system, except as hereinafter appears. The control levers, associated with the several elements shown in Fig. 1, takes the form of switches in Fig. 3. The synchronizer control 27 comprises a switch blade 31 having an off contact 32 and an on contact 33; manual control lever 28 of Fig. 1 takes the form of a switch blade 34 having an off position in which it is shown in Fig. 3, a decrease speed contact 35 and an increase speed contact 36; the feather, unfeather control lever 29 is shown as a double pole, double throw push-pull switch plate 37 having a series of feather contacts 38, 39 and 40, and a series of unfeathering contacts 41 and 42; and the negative automatic unreverse control lever 30 takes the form of a double pole double throw switch 43 having negative thrust contacts 44 and 45 and automatic unreverse contacts 46 and 47.

The actuator 18 of Fig. 1 is shown in Fig. 2 as a shunt wound D. C. reversible motor having an armature 51 and a shunt field 52. Three separate and distinct power circuits are provided for effecting energization of the armature 51. These power circuits include a continuous current supply provided by the aircraft D. C. supply system for high degree energization of the actuator, this supply being used to continuously energize the field 52 of the actuator through wire 69; a constant rate pulsing D. C. supply for intermittent energization of the armature 51 when manual speed control is selected for low degree energization of the actuator; and a variable rate pulsing D. C. supply for intermittent energization of the armature 51 under the control of the synchronizer 20 for variable degree energization of the actuator. In multi-engine aircraft having a control system constructed according to the present invention, the continuous and constant rate pulsing power circuits are common to all actuators, while each propeller unit control system has an individual variable rate pulsing circuit. The constant rate pulsing D. C. circuit is provided by a shunt wound constant speed D. C. motor including field 53 and armature 54 shown in Fig. 3. The armature shaft is connected by mechanical linkage 55 to a rotary switch blade 56 which cooperates with a pair of arcuate contacts 57 and 58 to supply a constant rate pulsing D. C. current to wire 59 whenever the aircraft master switch, not shown, is in the on position. Wire 59 is connected to contact 58 while contact 57, one side of the armature 54 and one side of the field 53, are connected to a wire 60 having connection with the aircraft D. C. power supply. The other sides of the field 53 and armature 54 are connected to ground.

The variable rate pulsing D. C. circuit, designated as the error pulse generator 25 in Fig. 1, includes a three phase stepping motor 61 (Fig. 2) having mechanical connection 62 with a wiper or rotor arm 63 that cooperates with three contacts 64, 65 and 66. The wiper arm 63 is connected through a condenser 67 to ground. Contact 65 is connected by means of wire 68 to a power supply wire 69 having connection with the D. C. aircraft power supply. Contact 64 is connected by wire 70 through a resistance R1 to a grid G1 of a dual triode tube T1 having an increase R. P. M. tube section 71 and a decrease R. P. M. tube section 72. The increase R. P. M. tube section includes a filament F1, a cathode C1, grid G1 and a plate P1, while the decrease R. P. M. tube section includes a filament F2, cathode C2, grid G2 and plate P2. Contact 66 is connected by wire 73 to a resistance R2 to the grid G2 of the decrease R. P. M. tube section 72. The filaments F1 and F2 are connected in parallel to a suitable filament supply source, not shown. The cathodes C1 and C2 are connected by leads to the movable elements of a pair of potentiometers P3 and P4, respectively, by which the D. C. bias on each of the tube sections 71 and 72 is controlled. The potentiometers P3 and P4 are connected between ground, by wire 74, and the aircraft D. C. power supply, by wires 75 and 69. The plates P1 and P2 are connected through resistors R3 and R4, respectively, to the coils of an increase synchronizer relay ISR and a decrease synchronizer relay DSR and thence to any suitable high voltage power supply B+, not shown. The wiper arm capacitor 67 obtains a charge when the wiper arm 63 engages contact 65 and discharges through either of grid leak resistors R5 or R6, depending upon the direction of rotation of wiper arm 63 as controlled by the stepping motor 61. The discharge of the capacitor 67 through either of the grid leak resistors R5 and R6 permits plate current to flow through either tube section 71 or 72 and the relay coils ISR or DSR.

The pulse rate of the error pulse generator 25 is controlled by the speed or rotation of the stepping motor 61 and the section of tube T1 which is energized, depending upon the direction of stepping motor rotation which is determined by the character of the off-speed. By character of the off-speed, we mean whether the propeller unit is operating at a speed greater than that of the master reference speed source 24 or at a speed lesser than that of the master reference speed source. The stepping motor 61 is energized by the output of the synchronizer 20, the synchronizer taking the form of that disclosed and claimed in copending application, Serial No. 94,944, filed in the name of James W. Light, et al., on May 24, 1949, now Patent No. 2,673,309. Briefly, the synchronizer includes an alternator (not shown) driven by the propeller shaft 15 serving as an input to a speed sensing unit, with the master reference speed source in the form of a standard frequency generator as the other input to the speed sensing device. Any difference in frequency between the reference frequency and that produced by the propeller driven alternator is sensed by a phase-sensitive discriminator circuit. For the purposes of the present invention, it is sufficient to say that the discriminator is sensitive to the amount of speed error as well as the character of the speed error and energizes the three-phase stepping motor 61 in accordance with these determinations.

It is thought that the circuitry can best be described by discussing the circuit connections involved to obtain each of the several propeller functions. The feathering circuit will first be described. When the push-pull feathering switch 37 is operated so that contact plate 76 engages contacts 38, 39 and 40, the following circuits will be completed. As contact 40 is connected to wire 69 and the aircraft D. C. power supply, contacts 38 and 39 will have applied thereto a positive potential. Contact 39 is connected by wire 77, through holding coil 78 which maintains the contact plate 76 in engagement with the contacts 38, 39 and 40 after initial depression of the switch button, and wires 79 and 80 to ground through a feathering limit switch FLS. Wire 80 is also connected to one side of the feather relay coil FR, the other side of the feather relay coil being connected by wire 81 to contact 38 so that the feather relay coil FR is energized when the contact plate 76 is in engagement with the contacts 38, 39 and 40. The feathering relay includes spaced contacts 82, 83, 84 and 85 and movable armatures 86 and 87. When the relay coil FR is de-energized the armatures 86 and 87 are maintained in engagement with contacts 82, 84 respectively. During energization of the relay coil FR, the armatures 86 and 87 are moved into engagement with contacts 83 and 85, respectively. Armature 86 is connected by wire 88 to ground, while armature 87 is connected by wire 89 to wire 69 and the aircraft D. C. power supply. Relay contact 82 is connected by wire 90 to an armature 91 of a negative relay to be described. Relay contact 84 is connected by wire 92 to a second armature 93 of the negative relay. Relay contact 83 is connected by wire 94 to one side of the armature 51 and relay contact 85 is connected by wire 95 to the other side of the actuator armature 51. Accordingly, when the feathering switch is closed, the feathering relay will complete the circuit connections for energizing the actuator 18 whereby the regulator lever 14 will be moved to effect movement of the propeller blades into the feathering regime. The actuator 18 continues to drive the regulator lever 14 until the feather limit switch FLS, which is mechanically connected to the actuator through the gear reduction 17, is opened whereby the feather relay coil FR will be deenergized as will the actuator 18.

When the pilot decides to unfeather a particular propeller unit, the switch 37 is pulled out to effect engagement between contact plate 76 and contacts 41 and 42. Contact 41 is connected by wire 96 through the manual increase contact 36 and wire 97 to relay contact 98 of a synchronizing relay to be described. Contact 42 is connected by wire 42a to wire 69 and the aircraft D. C. power supply. Synchronizing relay contact 98 is engaged by a synchronizer relay armature 99 only when the synchronizer relay coil SR is deenergized. Armature 99 is connected by wire 100 to one side of the increase R. P. M. relay coil IR. The other side of the relay coil IR is connected by wire 101 through the maximum control speed limit switch MCSLS to ground. Accordingly, the increase R. P. M. relay coil IR will be energized when the switch 37 is moved to unfeathering position only if the synchronizer relay coil SR is deenergized.

The increase R. P. M. relay includes contacts 102, 103, 104 and 105 and movable armatures 106 and 107. Armature 106 is connected by wire 108 to relay contact 109 of the negative relay. Armature 107 is connected by wire 110 to relay contact 111 of the negative relay. When the relay coil IR is deenergized, armatures 106 and 107 are in engagement with contacts 102 and 104, respectively. Contact 102 is connected by wire 112 to a movable armature 113 of a decrease R. P. M. relay to be described. Contact 104 is connected by wire 114 to a movable armature 115 of the decrease R. P. M. relay. When the relay coil IR is energized, armatures 106 and 107 are moved into engagement with relay contacts 103 and 105, respectively. Relay contact 103 is connected by wire 116 to a wire 117 which is connected at opposite ends to wire 95 and relay contact 118 of the negative relay. Relay contact 105 is connected by wire 119 to a wire 120 which is connected at opposite ends to wire 94 and relay contact 121 of the negative relay. As wires 94 and 95 are connected with opposite sides of the armature 51, the armature 51 will be energized whereby the actuator will rotate in a direction opposite to that which is rotated to obtain feathering, when the increase R. P. M. relay coil IR is energized through the unfeathering contacts of the switch 37 and the synchronizing relay coil SR and the feathering relay coil FR are deenergized. Thus armature 106 is connected by wire 108 through relay contact 109, armature 91 and wire 90 to ground through relay contact 82, armature 86 and wire 88. Armature 107 is connected by wire 110 through relay contact 111 and armature 93 to wire 92 which is connected through relay contact 84 and armature 87 to wire 89 and wire 69 to the aircraft D. C. power supply. Accordingly, the actuator will be energized to bring the propeller lever 14 out of feather until the unfeather button is released or the actuator maximum speed control limit switch MCSLS is actuated to disrupt the electrical connections to armature 51.

At this point, it may be well to note that the actuator output linkage 16 is effected to move the regulator control lever 14 throughout a rather small arcuate distance. The actuator is provided with four limit switches as is shown in Fig. 2, including an operational idle limit switch OILS, the maximum controlling speed limit switch aforedescribed, the feathering limit switch aforedescribed, and a negative limit switch NLS. These switches are actuated by a four lobe cam, not shown, which is driven by the output of the gear reduction unit 17 so as to control certain circuits for purposes which will later be apparent.

Limit switch OILS includes a contact 124 and a switch blade 125, the contact 124 being connected to wire 126 and the switch blade 125 being connected to ground. The limit switch MCSLS includes a pair of contacts 127 and 128 and the movable contact blade 129 which is connected to ground. The contact 127 is connected with wire 101 and the contact 128 is connected with wire 130, the wire 130, in turn, being connected to a movable armature 131 of an automatic unreversing relay to be described. Wire 130 is also connected by means of wire 132 through a light 133 to a wire 134 to the aircraft D. C. power supply. The limit switch FLS includes a contact 135 and a movable switch blade 136a, the switch blade being connected to ground. Contact 135 is connected to wire 80 and is also connected by a wire 136 to a switch blade 137 of the limit switch NLS. The limit switch NLS further includes a pair of contacts 138 and 139. The contact 138 is connected to a wire 140 which has connection with one side of negative relay coil NR. Wire 140 is further connected by wire 141 to one side of synchronizer relay coil SR. Switch contact 139 is connected to a wire 142 which is connected to one side of an automatic unreversing relay coil AUR. The limit switches associated with the actuator 18 are operated in the following sequence during movement of the regulator lever 14 from the feathering position to the full negative position: FLS, OILS, MCSLS and NLS. The feathering limit switch FLS deenergizes the actuator 18 when the blades have been moved to the feathered position, the negative limit switch NLS disrupts the connection to the actuator when the blades have been moved to the maximum negative thrust angle, the maximum control speed limit switch MCSLS moves from contact 127 to contact 128 when a predetermined low pitch angle in the manual speed control regime has been reached, and the operational idle limit switch OILS deenergizes the actuator 18 when a predetermined high angle is obtained in the manual speed control or synchronizing regimes. In other words, the switch FLS is in the position shown in Fig. 2 at all times except when the propeller blades are feathered. Similarly, the switch NLS engages contact 138 at all times except when the blades are moved to the negative low pitch stop angle at which time, NLS engages contact 139. Switch MCSLS engages contact 127 at all times when the propeller blades are at a postiive angle greater than a predetermined angle, and engages contact 128 when the blades are below the predetermined positive low blade angle or in the negative thrust range. Switch OILS engages contact 124 at all times when the angle of the blades is below a predetermined high positive angle, and is open whenever the blades are at an angle in excess of the predetermined high positive angle and when the blades are feathered.

The negative circuit will be described next. The negative control switch 43 includes a pair of interconnected switch blades 143 and 144, both of which are connected to the aircraft D. C. power supply. Switch blade 143 cooperates with contacts 44 and 46, while switch blade 144 cooperates with contacts 45 and 47. Contact 44 is connected by wire 145 to a solenoid stop, not shown, associated with the regulator arm 14, similar in character to that disclosed in copending application Serial No. 245,671, filed September 8, 1951, in the name of Treseder, et al. Contact 45 is connected by a wire 146 to one side of the negative relay coil NR Contact 47 is connected by wire 147 to an armature 148 of the automatic unreversing relay. When the switch 43 is manipulated to place switch blades 143 and 144 in contact with 44 and 45, respectively, the solenoid stop, not shown, is released permitting movement of the regulator control lever 14 into the negative regime. In addition, power will be supplied through contact 45 and wire 146 to one side of the negative relay coil NR, the other side of which is grounded through wire 140, negative limit switch NLS, wire 136, and feathering limit switch FLS. The negative relay includes contacts 111, 121, 109 and 118, and movable armatures 93 and 91 which cooperate, respectively, with contacts 111 and 121 and contacts 109 and 118. Contact 111 is connected by a wire 110 to movable armature 107 of the increase R. P. M. relay. Contact 121 is connected by wire 120 to wire 94 and one side of the armature 51. Armature 93 is connected by wire 92 to contact 84 of the feather relay which is, in turn, connected by armature 87 to the aircraft D. C. power supply when the relay coil FR is deenergized. Relay contact 109 is connected by wire 108 to movable armature 106 of the increase R. P. M. relay. Relay contact 118 is connected by wire 117 to wire 95 and the other side of the armature 51. Armature 91 is connected by wire 90 to relay contact 82 of the feathering relay which is connected through deenergized relay armature 86 and wire 88 to ground. Accordingly, with the switch blades 143 and 144 in engagement with contacts 44 and 45, the negative relay coil NR will be energized whereupon armatures 93 and 91 will be moved into engagement with contacts 121 and 118, respectively. In this manner armature 51 will be energized through contacts 121 and 118 of the negative relay and the actuator 18 will move the regulator control lever 14 into the negative position until the negative limit switch NLS is actuated to move switch blade 137 out of contact with 138 and into engagement with contact 139 whereupon the negative relay coil NR will be deenergized, which will disrupt the connections to the armature 51. It is readily apparent that in the negative circuit, the feathering relay coil FR must be deenergized to obtain movement of the regulator control lever by the actuator into the negative thrust regime.

Upon actuation of the negative limit switch NLS and its contact blade 137 into engagement with contact 139, the automatic unreversing relay coil AUR is energized in the following manner: One side of the coil AUR is always connected by wire 149 to wire 69 and the aircraft D. C. power supply. The other side of the coil AUR is connected by wire 142 to the contact 139 of the negative limit switch. Accordingly, when the grounded switch blade 137 is moved into engagement with the contact 139, the relay coil AUR will be energized, thereby establishing circuits for moving the blades out of the negative thrust regime as soon as the switch 43 is moved into the position it is shown in Fig. 3. The automatic unreversing relay includes a pair of contacts 150 and 151 which cooperate, respectively, with movable armatures 131 and 148. Movable armature 131 is connected by wire 130 to contact 128 of the maximum control speed limit switch MCSLS, and movable armature 148 is connected by wire 147 to contact 47 of the switch 43. Contact 150 is connected by wire 152 to the wire 142, and contact 151 is connected by wire 153 to wire 81 and one side of the feather relay coil FR. Movable armature 131 is also connected by wires 130 and 132 through the light 133 to the aircraft D. C. power supply.

Accordingly, when the switch blade 144 is moved into engagement with contact 47, the feathering relay coil FR will be energized through wire 147, armature 148, contact 151, wire 153, and wire 80, the wire 80 being connected to ground through the feather limit switch FLS. The light 133 will be on and the armature 51 will be energized through the contacts 83 and 85 of the feathering relay which are engaged by movable armatures 86 and 87, respectively, during energization of the feather relay coil FR. Accordingly, the actuator will move the regulator control lever 14 until the maximum control speed limit switch blade 129 is moved out of engagement with contact 128 and into engagement with contact 127 whereupon the automatic unreversing relay coil AUR will be deenergized, as will the feather relay coil FR and the electrical connections to the armature 51 be disrupted.

The switch blade 129 will be moved into engagement with contact 128 during movement of the regulator control lever 14 to the negative position and will be maintained in this position until the regulator control lever arm is moved out of the negative range into a position determinative of the predetermined angle at which the switch blade 129 moves out of engagement with contact 128 and into engagement with contact 127. As soon as the regulator control lever 14 begins moving out of the negative thrust position, the switch blade 137 of the negative limit switch will be moved out of engagement with contact 139 and into engagement with contact 138. However, this will not disrupt the electrical connections to the automatic unreversed relay coil AUR since once the coil has been energized, the ground connections thereto will be maintained through wire 152, contact 150, armature 131, wire 130, maximum control speed limit contact 128, switch blade 129 to ground. The solenoid stop, not shown, will also be deenergized by movement of the switch 43 into the position it is shown in Fig. 3 whereby movement of the regulator control lever 14 will not be restricted from coming out of the negative thrust position. When the light 133 goes off, it indicates that the blades have reached the maximum control speed position.

When the synchronizer switch 31 is moved out of engagement with contact 32 and into engagement with contact 33, the aircraft D. C. power supply is connected from wire 60 through the switch 31 and contact 33 to wire 172 to one side of the synchronizer relay coil SR. The other side of the synchronizer relay coil is connected to ground via wire 141, wire 140, contact 138 of the negative limit switch, switch blade 137, wire 136, contact 135 of the feather limit switch and switch blade 136a. The synchronizer relay includes contacts 98, 173, 154 and 155 and movable armatures 99 and 156 which cooperate, respectively, with contacts 98 and 173 and contacts 154 and 155. Contact 98 is connected by wire 97 to contact 36 of the increase and decrease R. P. M. switch 34. Contact 173 is connected by wire 157 to a movable armature 158 of the increase synchronizing relay. Contact 154 is connected by wire 159 to contact 35 of the increase and decrease R. P. M. switch 34, and contact 155 is connected by wire 160 to a movable armature 161 of the decrease synchronizing relay. Armature 158 of the increase synchronizing relay is movable into the engagement with a contact 162 when the coil ISR is energized, and armature 161 is movable into engagement with a contact 163 when the coil DSR is energized.

Contacts 162 and 163 are both connected via wire 69 to the aircraft D. C. power supply. Armature 99 of the synchronizing relay is connected via wire 100 to one side of the increase R. P. M. relay coil IR, the other side of which is connected by wire 101 through the closed contact 127 and switch blade 129 of the maximum control speed limit switch to ground. Movable armature 156 is connected by wire 164 to one side of the decrease R. P. M. relay coil DR and the other side of which is connected by wire 126 through the closed contacts of the operational idle limit switch OILS to ground. Accordingly, when the switch blade 31 is moved into engagement with the contact 33, the synchronizer relay coil SR will be energized and the armatures 99 and 156 will be moved into engagement with contacts 173 and 155, respectively.

With the several parts in this position, neither the decrease R. P. M. relay coil or the increase relay coil IR will be energized if the speed of the particular propeller unit is the same as that of the master reference speed source 24. However, if the speed of the propeller unit should be below that of the master speed source, the synchronizer unit 20 sensing this speed error will energize the stepping motor 61 in such a manner that the wiper arm 63 will move counterclockwise as viewed in the drawing whereupon the condenser 67 will discharge through grid leak resistor R5 associated with tube section 71 whereupon the increase synchronizer relay ISR will be periodically energized, the rate of which depends upon the amount of speed error. Intermittent energization of coil ISR will intermittently move 158 in with contact 162 whereupon the increase R. P. M. relay coil IR will be periodically energized via wire 157, contact 173, armature 99 and wire 100. The circuits which the increase R. P. M. relay coil IR completes will be described more fully hereinafter in the discussion pertaining to the manual speed control system. Suffice it for the present time to say that the actuator 18 will move the regulator control lever 14 to a position calling for a lesser pitch angle whereby the speed of the propeller unit will be increased to coincide with that of the master reference speed source.

Likewise, if the speed of the particular propeller unit should be above that of the master reference speed source 24, the synchronizer 20 will energize the stepping motor 61 to effect clockwise movement of the wiper arm 63. In this instance, the condenser 67 will periodically discharge through grid G2 of tube 71 and the decrease synchronizer relay coil DSR will be intermittently energized. Intermittent energization of coil DSR will effect intermittent engagement between armature 161 and contact 163 whereupon the decrease R. P. M. relay coil DR will be energized via wire 160, contact 155 and armature 156 of the synchronizer relay and wire 164. The circuits completed by energization of the decrease relay coil DR will likewise appear more fully hereinafter in the discussion of the manual speed control system. It is sufficient to say here that the actuator will be energized to move the regulator control lever 14 to increase the pitch of the propeller blades and reduce the speed of the propeller unit so that it again coincides with that of the master speed source 24.

The manual speed control circuits include a decrease R. P. M. circuit and an increase R. P. M. circuit. When the switch blade 34 is moved into engagement with contact 36, the constant rate pulsing supply provided by motor-switch combination 54, 56 will be connected via wires 59 and 97 through contact 98 and armature 99 when the synchronizer relay coil SR is deenergized, to wire 100 and one side of the increase R. P. M. relay coil IR. The other wire of the coil IR is connected to ground via wire 101 and contact 127 and switch blade 129 of the maximum control speed limit switch.

Energization of the relay coil IR will effect movement of armatures 106 and 107 into engagement with contacts 103 and 105. Armature 106 is connected by wire 108 and contact 109 and armature 91 when the negative relay coil NR is deenergized to wire 90. Wire 90 is, in turn, connected through relay contact 82 and armature 86 when the feather relay coil is deenergized to wire 88 which is connected to ground. Armature 107 is connected by wire 110 through relay contact 111 and armature 93 when the negative relay coil NR is deenergized to wire 92. Wire 92 is, in turn, connected through relay contact 84 and armature 87 to wire 89 when the feather relay coil FR is deenergized, wire 89 being connected to the aircraft D. C. power supply. Accordingly, when the increase relay coil IR is intermittently energized by the regulated pulsating supply, one side of the armature 51 will intermittently be connected to ground by engagement between armature 106 and contact 103 via wires 116, 117 and 95. The other side of the armature 51 will intermittently be connected to the D. C. power supply via armature 107, contact 105, and wires 119, 120 and 94. Accordingly, the actuator 18 will be energized to move the regulator control lever 14 until the pilot returns the blade 34 to the neutral position, as it is shown in Fig. 3, or the maximum control speed limit switch blade 129 is moved out of engagement with contact 127 and into engagement with contact 128 whereupon the ground connection to relay coil IR will be disrupted.

To manually decrease propeller speed, the pilot moves the blade 34 into engagement with contact 35 whereupon the regulated pulsating D. C. supply is connected via wire 59, switch blade 34, contact 35 and wire 159 to contact 154 of the synchronizer relay. If the coil SR is deenergized, the pulsating supply will be connected by engagement between contact 154 and armature 156 to wire 164 and one side of the decrease R. P. M. relay coil DR. The other side of the decrease R. P. M. relay coil DR is connected by wire 126 through the contact 124 and switch blade 125 of the operational idle limit switch to ground. The decrease R. P. M. relay includes movable armatures 113 and 115 which cooperate, respectively, with contacts 165 and 166. Armature 113 is connected by wire 112 to contact 102 of the increase R. P. M. relay. Armature 115 is connected via wire 114 to contact 104 of the increase R. P. M. relay. Hence, if the coil IR is deenergized, contact 102 will be in engagement with armature 106, while contact 104 will be in engagement with armature 107. Armatures 106 and 107 of the increase R. P. M. relay coil are connected as hereinbefore described in connection with the manual increase R. P. M. circuit to ground and the D. C. power supply, respectively, through the deenergized position of the armatures of the feathering relay when the coil FR is deenergized. Contact 165 is connected by a wire 167 to wire 120, wire 120, in turn, being connected via wire 94 to one side of the armature 51. Contact 166 is connected by wire 168 to a wire 117, which is, in turn, connected to wire 95 and the other side of the armature 51. Accordingly, when the decrease relay coil DR is intermittently deenergized by the constant rate pulsing supply, armatures 113 and 115 will intermittently engage contacts 165 and 166. In this manner, a pulsating current will be supplied through the closed contacts of the decrease R. P. M. relay via wires 167, 120 and 94, and wires 168, 117 and 95 to the armature 51 of the actuator. The actuator will continue its vernier movement and move the regulator control lever 14 to obtain a decrease in propeller speed until either switch 34 is again moved to its neutral position or the operational idle limit switch OILS is actuated to move switch blade 125 out of engagement with contact 124 whereupon the ground connection to the relay coil DR is disrupted. In this manner, it is seen that the speed cannot be manually decreased below the operational idle speed by manual control nor can it be increased above the maximum control speed by manual control.

As hereinbefore mentioned, a plurality of power circuits are provided for energizing the actuator 18 to obtain the control desired in that it is necessary to be able to move the lever from full negative to full feather at a rapid rate, while the propeller governor must be manually adjustable throughout the entire governing range at a relatively slow rate. In addition, the synchronizer must of necessity have a separate power circuit to perform its function satisfactorily. Moreover, the relays are so interconnected that each control function will override the one that follows it in this order: Feathering, negative thrust, synchronizer on, unfeathering, manual increase R. P. M. and manual decrease R. P. M. The interconnection of the relays is a safety feature whereby certain propeller functions will take precedence over others in case of a malfunction occurring in the electrical circuitry.

Thus, the feathering relay FR will be energized whenever switch 37 is closed inasmuch as the circuit for relay FR may be completed by switch 37 if the limit switch FLS is closed, which condition exists at all times except when the propeller blades are feathered. However, the negative relay NR can only be energized by the switch 43 when the limit switch NLS engages contact 138 so that the circuit may be completed through limit switch FLS. Thus, if a malfunction should occur in the circuitry of the feathering circuit, namely, if switch FLS should fail to close, the negative thrust circuit is rendered inoperative. However, inasmuch as the feathering circuit does not depend for operation upon the operability of the negative thrust circuit, it may be said that the feathering circuit overrides the negative thrust circuit.

In a similar manner, the energization of synchronizing circuit relay SR depends upon the operativeness of limit switches FLS and NLS. Thus, if either the feathering or negative circuits are rendered inoperative, the synchronizing circuit will not function. Likewise, as the unfeathering circuit is connected through the increase R. P. H. relay IR, it is apparent that the synchronizing relay SR must be deenergized before the unfeathering circuit can be operated. Consequently, it may be said that the synchronizing circuit overrides the unfeathering circuit. Moreover, since the unfeathering circuit includes relay IR and switch 35, it is obvious that the unfeathering circuit overrides the manual increase R. P. M. circuit. Similarly, since the manual decrease R. P. M. circuit can only be energized when the relay IR is deenergized, it is apparent that the manual increase R. P. M. circuit will override the manual decrease R. P. M. circuit in the arrangement disclosed.

While the embodiment of the present invention as herein disclosed, constitutes a preferred form, it is to be understood that other forms might be adopted.

What is claimed is as follows:

1. Control means for an electric actuator operatively connected with pitch controlling means of a variable pitch propeller having a plurality of functions comprising, governing, speed synchronization with a reference speed source, feathering and negative thrust, including in combination, an electric power source for energizing said actuator, circuit means for continuous energization of said actuator, circuit means including a constant rate pulsing device for intermittent energization of said actuator, circuit means including a variable rate pulsing device for intermittent energization of said actuator, and selecting means for connecting only one of said circuit means at a time with said actuator.

2. Control means for an electric actuator operatively connected with pitch controlling means of a variable pitch propeller having a plurality of functions comprising, governing, speed synchronization with a reference speed source, feathering and negative thrust, including in combination, an electric power source for energizing said actuator, circuit means for continuous energization of said actuator, circuit means including a constant rate pulsing supply for intermittent energization of said actuator, circuit means including a variable rate pulsing supply for intermittent energization of said actuator, and selecting means for connecting only one of said circuit means at a time with said actuator, said selecting means including a plurality of circuits each having a manually operable switch for initiating a propeller function and a plurality of relays in circuit connection between said circuit means and said actuator, said relays being so interconnected that certain propeller functions override others in the event of a malfunction occurring in the selecting means.

3. Control means for an electric actuator operatively connected with pitch controlling means of a variable pitch propeller unit having a plurality of functions comprising, governing, speed synchronization with a reference speed source, feathering and negative thrust, including in combination, an electric power source for energizing the said actuator including a variable rate pulsing device for intermittent energization of said actuator, selecting means for connecting said power source with said actuator, said selecting means including a synchronizing circuit comprising a manually operable switch, a plurality of electrical interconnected relays in circuit connection between said variable rate pulsing power device and said actuator, and a pair of limit switches operable by said actuator for establishing the range of synchronization speed adjustment, each of said switches being operable by said actuator to deenergize the same upon predetermined movement in opposite directions of said pitch control means.

4. The combination set forth in claim 3, wherein the rate of the pulsing power device for the synchronizing circuit is determined by means responsive to a difference in speed between the reference speed source and the propeller unit, said means including a reversible electric stepping motor actuated in response to said speed difference, and a rotor arm driven by said motor for intermittently making and breaking a supply circuit to said electrically interconnected relays.

5. A control system for a plurality of variable pitch propeller units, each of which includes an internal pitch control mechanism and an external means to effect adjustment thereof, including in combination, an electric actuator operatively connected to the adjusting means of each propeller unit for moving the same, an electric circuit for each actuator through which all control signals thereto are transmitted, a source of electric power connectible with each electric circuit including a constant rate pulsing device common to all actuators and a variable rate pulsing device for each actuator, and manually operable means for individually effecting adjustment of the pitch control mechanism of each propeller unit by energizing each actuator from said power source through said constant rate pulsing device, or for conjointly effecting adjustment of the pitch control mechanism of all propeller units by energizing said actuators through said variable rate pulsing devices.

6. A control system for a plurality of variable pitch propeller units, each of which includes an internal pitch control mechanism and an external means to effect adjustment thereof, including in combination, an electric actuator operatively connected to the adjusting means of each propeller unit for moving the same, an electric circuit for each actuator through which all control signals thereto are transmitted, a source of electric power connectible with each electric circuit including a constant rate pulsing device common to all actuators and a variable rate pulsing device for each actuator, switch means in circuit connection between said constant rate pulsing device and the electric circuit for each actuator to effect adjustment of the pitch control mechanism of each propeller unit individually, and switch means in circuit connection between said variable rate pulsing devices and the electric circuits for all actuators to effect adjustment of the pitch control mechanism of all propeller units conjointly.

7. A control system for a plurality of variable pitch propeller units, each having a plurality of functions comprising, governing, speed synchronization with a reference speed source, feathering and negative thrust, and each having an internal pitch control mechanism and external means to effect adjustment thereof, including in combination, an electric actuator operably connected to said adjusting means of each propeller unit for moving the same, relay means for each actuator through which all control signals thereto are transmitted, a source of electric power for energizing each actuator, means controlling the degree of actuator energization from said power source comprising a constant rate pulsing circuit including a part of said relay means and a variable rate pulsing circuit including a part of said relay means, and selecting means for each propeller unit for connecting only one of said circuits at a time with each actuator.

8. A control system for a plurality of variable pitch propeller units, each having a plurality of functions comprising, governing, speed synchronization with a reference speed source, feathering and negative thrust, and each having an internal pitch control mechanism and external means to effect adjustment thereof, including in combination, an electric actuator operably connected to said adjusting means of each propeller unit for moving the same, relay means for each actuator through which all control signals thereto are transmitted, a source of electric power for energizing each actuator, circuit means including a part of said relay means for continuous current supply to all actuators, circuit means including a part of said relay means and a constant rate pulsing device common to all actuators, circuit means including a part of said relay means and an individual variable rate pulsing device for each actuator, and selecting means for each propeller unit for connecting only one of said circuit means at a time with each actuator.

9. A control system for a plurality of variable pitch propeller units, each having a plurality of functions comprising, governing, speed synchronization with a reference speed source, feathering and negative thrust, and each having an internal pitch control mechanism and external means to effect adjustment thereof, including in combination, an electric actuator operably connected to said adjusting means of each propeller unit for moving the same, relay means for each actuator through which all control signals thereto are transmitted, a source of electric power for energizing each actuator, circuit means including a part of said relay means for continuous current supply to all actuators, circuit means including a part of said relay means and a constant rate pulsing device common to all actuators, circuit means including a part of said relay means and an individual variable rate pulsing device for each actuator, and selecting means for connecting only one of said circuit means at a time with each actuator, said selecting means including a plurality of circuits, each having a manually operable switch for initiating a propeller function.

References Cited in the file of this patent

UNITED STATES PATENTS

| | | |
|---|---|---|
| 2,217,856 | Brady | Oct. 15, 1940 |
| 2,334,967 | Thomas et al. | Nov. 23, 1943 |
| 2,346,007 | Chillson | Apr. 4, 1944 |
| 2,388,718 | Thomas et al. | Nov. 13, 1945 |
| 2,416,562 | Alexanderson | Feb. 25, 1947 |
| 2,595,345 | Engelhardt et al. | May 6, 1952 |
| 2,652,122 | Longfellow | Sept. 15, 1953 |